United States Patent [19]

Pellegrino et al.

[11] Patent Number: 4,682,092

[45] Date of Patent: Jul. 21, 1987

[54] SYNCHRONOUS MOTOR DRIVE WITH CHOPPER REGULATOR

[76] Inventors: John Pellegrino, 31 Bennington St., Quincy, Mass. 02169; Simyon Palmin, 11 Sandy Ridge Cir., Sharon, Mass. 02067

[21] Appl. No.: 741,877

[22] Filed: Jun. 6, 1985

[51] Int. Cl.$^4$ .......................................... H02K 19/10
[52] U.S. Cl. ................................... 318/696; 318/685
[58] Field of Search ............... 318/294, 138, 254, 696, 318/685

[56] References Cited

U.S. PATENT DOCUMENTS

| | | | |
|---|---|---|---|
| 3,560,817 | 2/1971 | Amato | 318/138 |
| 3,924,168 | 12/1975 | Woodward | 318/294 |
| 4,368,414 | 1/1983 | Watanabe et al. | 318/696 |
| 4,415,845 | 11/1983 | Oudet | 318/696 |
| 4,423,366 | 12/1983 | Gottwald | 318/696 |
| 4,581,565 | 4/1986 | Van Pelt et al. | 318/294 |

Primary Examiner—David Smith, Jr.

[57] ABSTRACT

In the disclosed system, a switching circuit energized from a source applies current pulses to the windings of a motor, such as a stepping motor. A chopper regulates the winding currents during each current pulse through four or more control cycles, a power cycle, a circulating cycle, a reset cycle and a second circulating cycle. The chopper enables current from the source to the winding during the power cycle; disables the source and forces residual current entirely within the switching circuit and outside the source during the circulating cycles; and constrains current flow from the winding through the source against the plurality of the source during the reset cycle. Preferably, a second switching circuit energizes a second winding and the chopper times the cycles so that the power cycle in one winding coincides with the reset cycle in the other winding.

21 Claims, 17 Drawing Figures

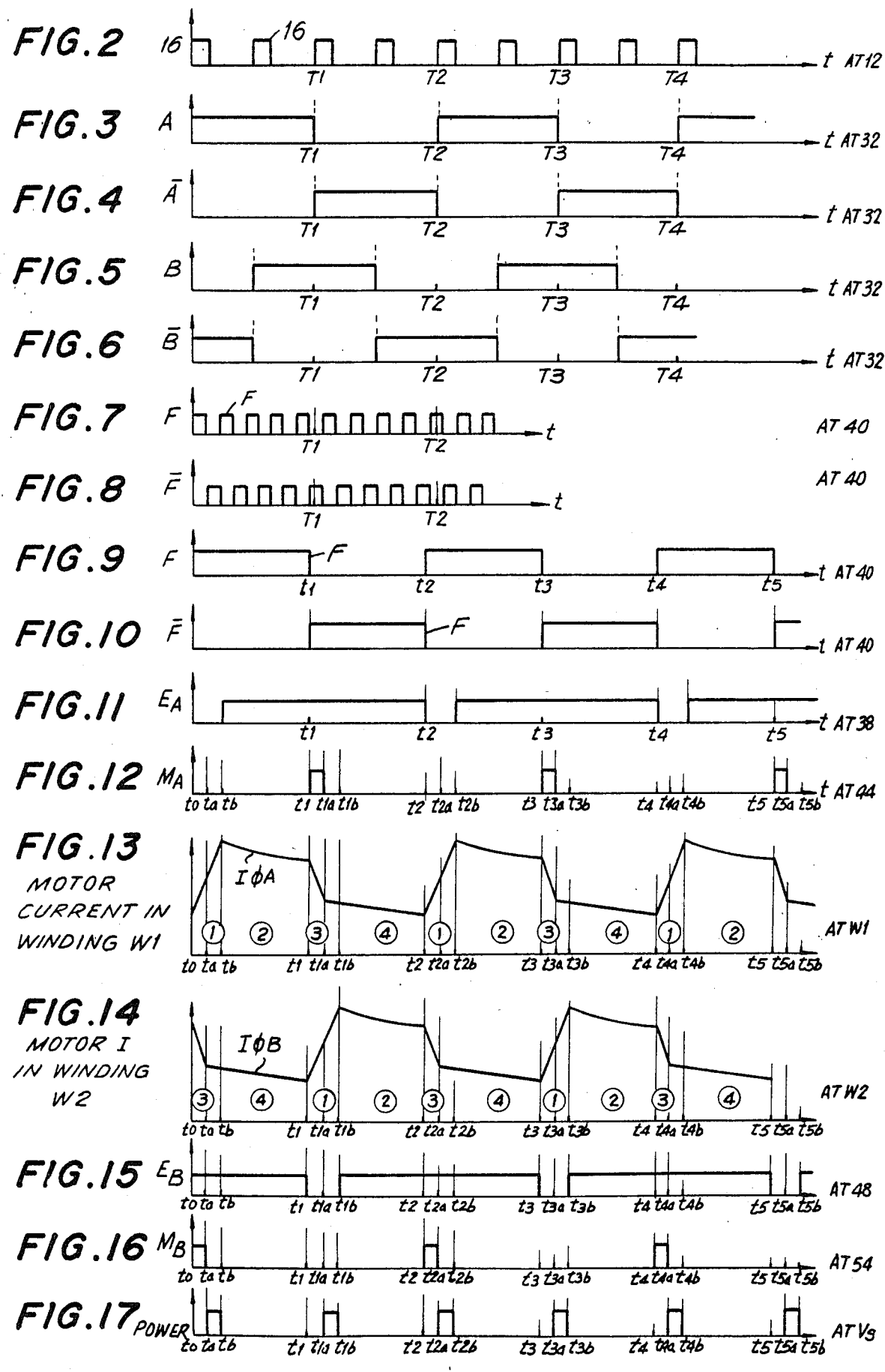

SYNCHRONOUS MOTOR DRIVE WITH CHOPPER REGULATOR

BACKGROUND OF THE INVENTION

1. Field of the Invention

This invention relates to synchronous motor systems, and particularly stepping motor drives which use chopping techniques to regulate currents in the motor windings. As used herein, the term synchronous motor refers to any motor whose advance depends upon the frequency of the power input.

A typical motor driver energizes the separate windings of a stepping motor with separate power switching circuits, such as bridge circuits, that direct the currents back and forth through the respective windings. A current-regulating chopper responds when the current in each winding exceeds a set value and turns off selected switches in the bridges. Freewheeling diodes in the bridge then direct the currents, formed by the collapsing field about each winding, around a path until the winding current drops below a given value. The chopper then allows the switches in the bridge to resume directing current through the winding until the current again rises above the set value or until the phase of the winding's current energization has been completed.

Two types of chopper controls exist. In one, the current formed by the field collapsing around the winding is circulated through a switch of the bridge and ground, and then a freewheeling diode. In another, non-circulating drive, a monostable multivibrator establishes the chopper time response to the winding current and turns off all the bridge's switches so that the current formed by the resulting collapsing field about the motor winding passes through the freewheeling diodes back to the source energizing the bridge against, the potential of the source.

A major disadvantage of circulating drives reside in the fact the chopping frequency varies with motor inductance. The range of frequency is typically between 2,000 and 15,000 Hz which causes unwanted audible noise. Drives with circulating choppers provide no control over peak currents when the motor is braking. In this situation the back EMF of the motor voltage is greater than the driver voltage and the resultant motor current may increase uncontrollably above the previously set value of the regulation loop.

The noncirculating choppers suffer from other disadvantages. Because the ripple current produced by the chopping is proportional to the supply voltage, the percent of ripple current becomes excessively large when operating with power supplies greater than 50 volts. The current regulator circuits for each of the two windings in the motor are nonsynchronous. Hence, the peak current flowing into and out of the power supply can be as large as two times the peak winding current. This causes excessive heating of the capacitors in the source, high electrical noise in the power supply and interconnecting cables, and a time varying ripple voltage on the power supply which causes motor current modulation. The large ripple currents make eddy current losses a significant factor and limit the output power delivered to a load. Rapid switching signals result in electrical noise that can couple to external electronic equipment.

An object of the invention is to improve synchronous motor systems.

Another object of the invention is to avoid the aforementioned disadvantages, either in whole or in part.

SUMMARY OF THE INVENTION

According to a feature of the invention, a switching circuit alternately supplies current to a winding of a synchronous motor. The current is regulated in any alternate period by enabling current flow from the source during a power "cycle", then disabling the current and discharging the winding through a common conductor during a circulation cycle following the power cycle, and then, while continuing to disable the current flow, discharging the winding against the source during a reset cycle following the circulation cycle. The term "cycle" is used herein in the sense used with devices such as a four "cycle" engine.

According to another feature of the invention the reset cycle is followed by yet another circulation cycle while the current remains disabled.

According to yet another feature of the invention, the current is enabled and disabled in a second winding of the motor.

According to yet another feature of the invention, timing means coordinate the enabling and disabling current to the two windings by making a power phase of one winding coincide with the reset phase of the other winding, and making the first circulating phase of the one winding occur during the second circulating phase of the other winding. So that one winding is feeding current back to the source while the other is having current feed by the source.

According to another feature of the invention, the timing means include a clock for producing clock pulses which initiate the power phase at the start of the first half-period of the clock pulse and initiate the reset phase at the start of the second half-period. The second recirculation phase is ended a given time after start of the second half-period.

These and other features of the invention are pointed out in the claims. Other objects and advantages of the invention will become evident from the following detailed description when read in light of the following drawings:

BRIEF DESCRIPTION OF THE DRAWINGS

FIG. 2 is a graph of command pulses applied to a timer of the system in FIG. 1.

FIGS. 3 to 6 are graphs of drive voltages applied by the timer to the bridges of the driver, shown on the same time scale as FIG. 2.

FIGS. 7 and 8 are graphs of clock pulses, shown on the same time scale as that of FIGS. 2 to 6, used by a chopper in FIG. 1.

FIGS. 9 and 10 are graphs of the clock pulses of FIGS. 7 and 8 on a time scale expanded relative to that of FIGS. 2 to 8.

FIGS. 11 and 12 are graphs of chopping pulses used to chop the voltages of FIGS. 3 to 6.

FIGS. 13 and 14 are graph currents in motor windings according to the invention.

FIGS. 15 and 16 are graphs of other chopping pulses used to chop the voltages of FIGS. 3 to 6.

FIG. 17 is a graph of power pulse in FIG. 1.

DESCRIPTION OF THE PREFERRED EMBODIMENTS

Figure 1:
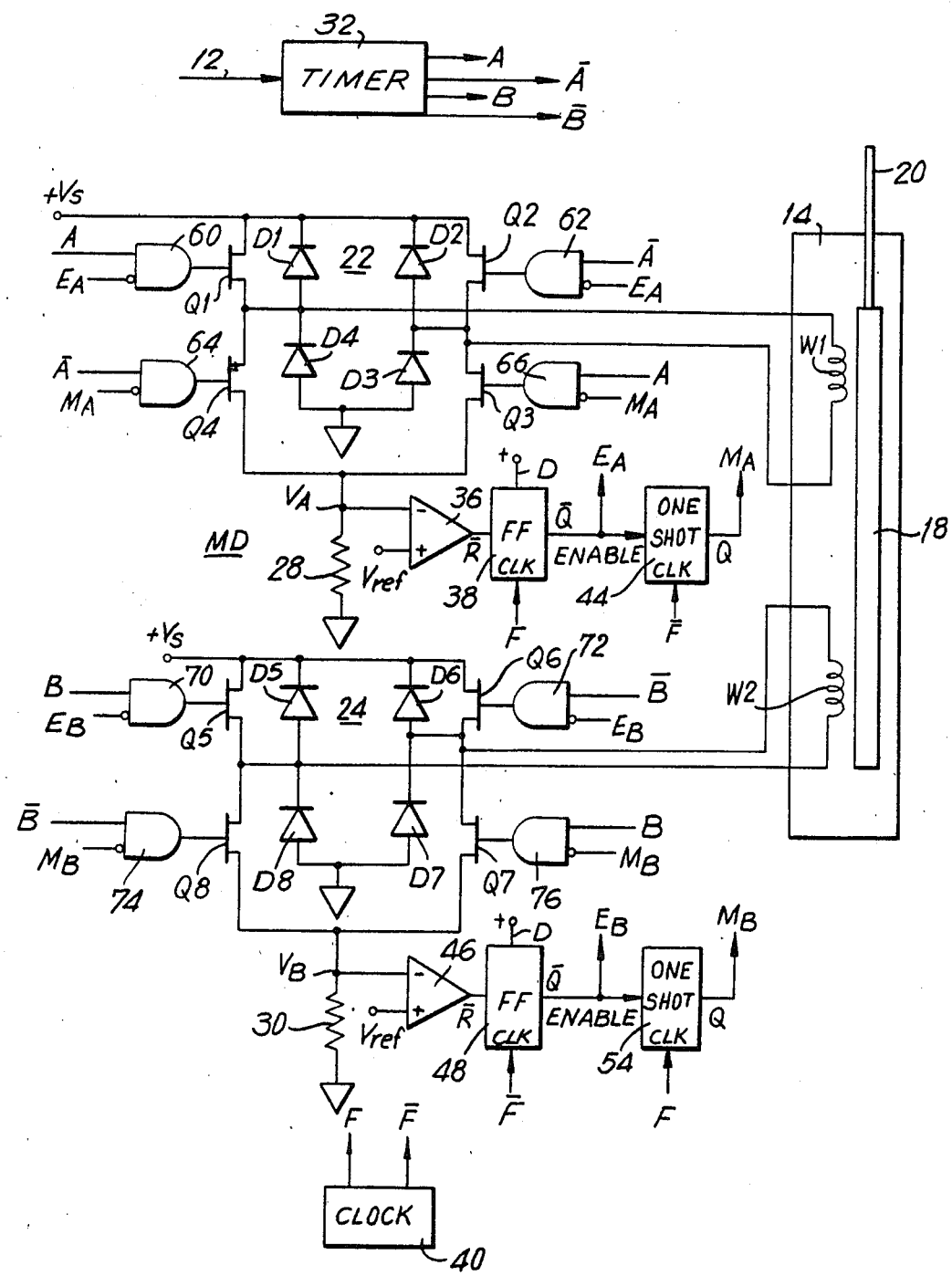
FIG. 1 is a partially schematic and partially block diagram of a system embodying features of the invention.

In FIG. 1, the motor drive MD of the invention receives command pulses on a command line 12 from a source not shown and drives a conventional stepping motor 14. Typical command pulses 16 are shown in FIG. 2. The motor 14 is a standard two phase stepping motor with a stator winding W1 and a stator winding W2 which, when suitably energized with pulses, step the motor's rotor 18 relative to the stator to drive a shaft 20 connected to the rotor. Motors and drives are generally disclosed in U.S. Pat. Nos. 4,255,696 and 3,560,821.

Typically, in such motors, outwardly-extending teeth on the rotor 18 face inwardly extending teeth on the stator. A current pulse passes through windings W1 to step the rotor 18 in one direction a fractional tooth pitch, and hence, realigns the rotor teeth relative to the teeth on the stator. A succeeding or overlapping current pulse in winding W2 steps the rotor R another fractional tooth pitch. The teeth are now aligned so a subsequent reverse pulse in winding 1 steps the motor another fractional tooth pitch in the same direction. Similarly, the next reverse pulse in the winding W2 steps the motor yet another fractional tooth pitch in the same direction. Hence, continuing reversal of currents through the windings W1 and W2 step the rotor 18 and the shaft 20 in the same rotary direction.

Two driver sections 22 and 24 apply the currents to the windings W1 and W2. In the section 22, a bridge is composed of field effect transistors (FETs) Q1, Q2, Q3, and Q4 which operates as switches. The bridge formed by FETs Q1, Q2, Q3, and Q4 energizes the windings W1 of the phase 1 in one direction when a voltage A turns on the gate of FETs Q1 and Q3 and the complementary voltage $\overline{A}$ turns off the gates of FETs Q2 and Q4. See FIGS. 3 and 4. The current passes from the positive supply Vs through elements Q1, W1, Q2, and a low value (e.g. 0.01 Ohm) resistor 28 to ground. The current direction through the winding W1 reverses when the voltages $\overline{A}$ and A are reversed. The path is now through elements Q2, W1, Q4, and 28 to ground. The resistor 28 in the ground path of FETs Q3 and Q4 senses the currents through the winding W1.

FETs Q5, Q6, Q7, and Q8, which also operate as switches, in the driver portion 24 form a second bridge. As shown in FIGS. 5 and 6, voltages B and $\overline{B}$ are 90 degrees out of phase with voltages A and $\overline{A}$. Current passes through the winding W2 in one direction when the voltages B turn on the FETs Q5 and Q7, and the voltages B turn off the FETs Q6 and Q8. The current reverses in windings W2 of phase 1 when the voltages B and B are reversed. A low value (e.g. 0.01 Ohm) resistor 30 in the ground path senses the currents through the windings W2 of phase P2.

A timer 32 at the input line 12 establishes the timing of the voltages A, $\overline{A}$, B, $\overline{B}$ in response to the input step pulses 16 which appear at the line 12, and whose pulse frequencies and phases determine the frequencies and phases of the voltages A, $\overline{A}$, B, $\overline{B}$. This is shown in FIGS. 2 to 6. Specifically, the timer 32 generates the voltages A, $\overline{A}$, B, and $\overline{B}$ so that the voltages A and $\overline{A}$ are 180 degrees out of phase with each other, as are the voltages B and $\overline{B}$. At the same time, the voltage B trails the voltage A by 90 degrees and the voltage $\overline{B}$ trails $\overline{A}$ by 90 degrees. Such timers are standard with two phase stepping motors.

The voltages $V_A$ and $V_B$ across the resistors 28 and 30 proportional to the currents $I_A$ and $I_B$ through the respective winding W1 and W2. A comparator 36 receives the voltage $V_A$ across the resistor 28 at its inverting input and compares this value with a reference voltage $V_{ref}$ at its non-inverting input. When the voltage $V_A$ exceeds the predetermined value set by $V_{ref}$, the normally high output voltage of the comparator 36 goes from high to low and resets a D flip-flop 38 whose D terminal is connected to a positive source. A clock 40 applies pulses F, at a frequency in excess of the frequency appearing on the line 12, as shown in FIG. 7, to the clock input of the flip-flop 38. A high pulse F sets the flip-flop 38 which then produces a low enable signal $E_A$ at the terminal Q of the flip-flop. A low signal at the reset terminal $\overline{Q}$ resets the flip-flop 38 which then turns the signal $E_A$ high until the flip-flop is again set by a high pulse F. A high enable signal $E_A$ enables a one shot circuit 44. This one shot circuit sets in response to high signal from the complimentary output $\overline{F}$ of the clock 40. The signal F is shown in FIG. 8. The one shot then switches the output $M_a$ at its terminal Q from low to high.

Similarly, a comparator 46 responds to the voltage $V_B$ across the resistor 30 exceeding the reference voltage $V_{ref}$. The output of the comparator 46 then goes low to reset a D flip-flop 48 which operates in the same manner as the flip-flop 38 in response to the $\overline{F}$ output of the clock 40. The comparator 46 produces a high enable signal $E_B$ at its terminal $\overline{Q}$ to enable a one shot circuit 54 that responds to a high output F of the clock 40. The one shot circuit 54 then switches the low signal $M_B$ at its Q terminal from low to high. The clock signals F and $\overline{F}$ are shown not only in FIGS. 7 and 8, but also on an expanded time scale in FIGS. 9 and 10.

The enable signal $E_A$ simultaneously enables and disables AND gates 60 and 62 to control application of the voltages A and $\overline{A}$ to the transistors (FETs) Q1 and Q2. The signal $M_A$ enables and disables AND gates 64 and 66 whose other inputs receive the voltages $\overline{A}$ and A from the timer 32, so as to control application of the voltages $\overline{A}$ and A to the transistors Q4 and Q3. The enable (or chopping) signal $E_A$ and $M_A$ are shown in FIGS. 11 and 12. They are each applied to an inverting input of the AND gates 60, 62, 64, and 66.

Similarly, the enable signal $E_B$ enables and disables AND gates 70 and 72 which receive voltages $\overline{B}$ and B at their other inputs. The signals $E_B$ therefore enable and disable application of the voltages B and $\overline{B}$ to the FETs Q5 and Q6. Similarly the signal $M_B$ is connected to the lower input of AND gates 74 and 76 whose upper inputs receive the voltages $\overline{B}$ and B from the timer 32. The signal $M_B$ thus enables and disables application of the voltages $\overline{B}$ and B to the transistors Q8 and Q7. The enable signals $E_B$ and $M_B$ are shown in FIGS. 15 and 16.

Freewheeling diodes D1, D2, D3, and D4 pass currents when the magnetic field about the winding W1 collapses. Similarly, freewheeling diodes D5, D6, D7, and D8 pass currents arising when the magnetic field around the winding W2 collapses.

In operation, the clock 40 applies signals F as shown in FIG. 9 and signals $\overline{F}$ as shown in FIG. 10. These signals occur within the time frame of the voltages A, $\overline{A}$, B, $\overline{B}$ as shown in FIGS. 2, 7, and 8, although it is possible for the frequency of the pulses input 12 to exceed the frequency of the clock 40. However, the present invention is concerned with conditions when the frequency of pulses at the line 12 is lower, and preferably substantially lower than the frequency of the clock 40. For example, if the clock frequency is 20 KHz, the command pulse should occur below 5 KHz.

The timer 32 applies voltages A, $\overline{A}$, and B, $\overline{B}$ to the gates 60, 62, 64, 66, and 70, 72, 74, 76. While the voltage $V_A$ across the resistor 28 is below the reference voltage $V_{ref}$ and the signal at the reset terminal $\overline{R}$ is high, positive going clock pulse F into the flip-flop 38 allows power to be delivered to the winding W1. That is, the flip-flop 38 produces a low enable pulse $E_A$ at its terminal $\overline{Q}$ while the output $M_A$ of the one shot 44 remains low. Hence, each of the AND gates 60, 62, 64, and 66 produces an output corresponding to the voltages A and $\overline{A}$. A high voltage A at their gates turns on FETs Q1 and Q3, while the low voltage $\overline{A}$ at the gates of Q2 and Q4 turn off the latter FETs. This allows current to be delivered to the winding W1 from the source $V_S$ through the elements Q1, W1, Q2, and 28. When the values of A and $\overline{A}$ reverse the current through W1 reverses. It flows from the source $V_S$ through elements Q2, W1, Q4, and 28.

The elements 36, 38, 44, and AND gates 60, 62, 64, and 66 chop the voltages at the FETs Q1 to Q4 to regulate or "chop" the current in the winding W1. A full period of of current chopping in the winding W1 has four unique "cycle"s as shown in FIG. 13 and 14. The term "cycles" used for the chopping is analogous to that term as used in mechanical engines. Each "cycle" refers to a phase of a single cycle. The chopping occurs, for example, during the overall half-period when the voltages A and $\overline{A}$ attempt to turn on transistors Q1 and Q3, while turning off transistors Q2 and Q4.

A power cycle 1 occurs when low signals $E_A$ and $M_A$ allow the voltages A and $\overline{A}$ to turn on the FETs Q1 and Q3 while turning off FETs Q2 and Q4. Now current passes from the positive voltage supply through the transistor Q1, the winding W1, the FET Q3, the sensing resistor 28 to ground. The low values of $E_A$ and $M_A$, which allows the winding current, occur during a high pulse F, a high at terminal $\overline{R}$ of flip-flop 38, and a low pulse $\overline{F}$. When the current $I_A$ through resistor 28 is sufficiently high, the voltage $V_A$ across the resistor 28 exceeds the reference voltage $V_{ref}$ in the comparator 36. This begins the circulation cycle 2.

That is, when the current reaches the maximum value $I_{PEAK}$ as determined by the voltage $V_{ref}$, the comparator 36 swings low and resets the flip-flop 38. This still occurs during the high pulse F from the clock 40. The enable signal $E_A$ now goes up and turns off the AND gates 60 and 62. FETs Q1 and Q2 are now turned off and FET Q4 remains off. The magnetic field around the motor winding W1 begins to collapse and passes current in the same direction as before through the FET Q3, the low resistance (0.01 ohm) resistor 28, ground, and back through the freewheeling diode D4. Because the voltage opposing the winding W1 is low, this circulating cycle 2, shown in FIG. 13, allows only a small drop in the current value. The drop continues until the clock reverses and a pulse $\overline{F}$ turns on the one-shot 44.

This begins the reset cycle 3. The output voltage $M_A$ swings high and turns off the AND gates 64 and 66. The off gates 64 and 66 now turns both the FETs Q3 and Q4 off. Hence, none of the FETs Q1 to Q4 is conductive. As the magnetic field around the winding W1 continues to collapse, current now passes through a higher opposing voltage path through diode D2, the positive supply, up through ground and back through the diode D4. This is shown by reset cycle 3 identified as 3 in FIG. 13.

The current drops more precipitously in this condition because of the high voltage opposing the motor winding W1.

At the end of a predetermined period of time, the one shot reverses itself. This establishes the circulating cycle 4. The AND gates 64 and 66 allow the voltages A and $\overline{A}$ again to control the FETs Q3 and Q4. Hence, FET Q3 is again conductive. The circulation cycle 4 which is identical to the circulation cycle 2, namely that the current flows through the conducting FET Q3 the low resistor 28, ground, and the diode D4 back to the winding W1. The slow current decay continues until the next clock pulse F flips the flip-flop 38 to reverse the voltage at the terminal $\overline{Q}$ so that the signal $E_A$ enables the AND gates 60 and 62 and allows the voltages A and $\overline{A}$ to control the FETs Q1 and Q2. The cycles 1 to 4 then repeats themselves.

Because the outputs of the clock 40 are reversed in flip-flop 48 and one-shot 54, the operation of the bridge 24 as well as the comparator 46 flip-flop 48, and one shot circuit 54 is 180 degrees out of phase with the operation of the bridge 22, comparator 36, flip-flop 38 and one shot 44. That is, when the clock pulse $\overline{F}$ triggers the one shot circuit 44, the same pulse is triggering the flip-flop 48. The output $M_B$ of the terminal Q of the one-shot circuit 54 and the output $E_B$ of the terminal $\overline{Q}$ of the flip-flop 48 turn on the AND gates 70 to 76 so as to allow the voltages B and $\overline{B}$ to control the gates FETs Q5 to Q8. Because of the phasing of the voltages A, $\overline{A}$, B, and $\overline{B}$, the voltage B overlaps the voltage A or $\overline{A}$. Assuming the voltage B overlaps the voltage A at this time, the voltages B and $\overline{B}$ try to constrain the FETs Q5 and Q7 to permit the positive voltage supply $V_s$ to drive current through the FET Q5, the winding W2, the FET Q7, the low resistor 30 to ground. When voltages B and $\overline{B}$ reverse, they attempt to turn on FETs Q6 and Q8 while turning off Q5 and Q7 so that current would flow through elements $V_S$, Q6, W2, Q8, 30, and ground.

Members 30, 46, 48, and 54 now chop the voltages B and $\overline{B}$ at the transistors Q5 to Q8. With a high pulse $\overline{F}$, a low $\overline{F}$, and a high at terminal $\overline{R}$ of flip-flop 48, the AND gates 70 to 76 allow the voltages B and $\overline{B}$ to control the bridge 24. This starts the power cycle 1. When current reaches the maximum allowed current as determined by the comparator 46 and the reference voltage $V_{ref}$ the comparator swings low to reset the flip-flop 48. This produces a high signal $E_B$ that disables AND gates 70 and 72 and turns off both transistors Q5 and Q6.

This starts the circulating cycle 2. The current now flows through FET Q7, resistor 30, ground, and up through diode D8 from the motor winding. This current is generated by the collapsing field around the winding W2.

The power cycle 1 and the circulating cycle 2 of phase B in the winding W2 coincides substantially with reset cycle 3 and circulation cycle 4 of phase A in the winding W1. Hence, while the voltage supply is suppling current to the winding W2, the reset cycle 3 in the phase A of winding W1 is returning current to the voltage supply. Similarly, the circulation cycle 2 of phase B through winding W2 occurs at the same time as the circulation cycle 4 of the phase A of the winding W1.

When the clock F reverses and triggers the one shot circuit 54, the output $M_B$ disables the AND gates 74 and 76 so as to turn off transistors Q7 and Q8. This starts the reset cycle3 for the phase B and causes the collapsing field of the winding W2 to drive a current through the diode D5 to the voltage supply, so that it returns from ground through the diode D8. This reset cycle 3 continues until the one shot circuit time period has ended. The signal M$_B$ now reverses and allows gates 74 and 76 to permit the voltages B and $\overline{B}$ to control the gates of the FETs Q7 and Q8.

The circulation cycle 4 now begins and the field around the winding W2 drives current through the transistor Q7, the resistor 30, ground, and the diode D8. Reversal of the clock 40 then reinitiates the power cycle 1.

Again, the reset cycle 3 of phase B in winding W2 coincide substantially with the power cycle 1 of phase A in winding W1. Hence, while the supply is delivering current to the winding W1, the winding W2 is delivering current back to the supply.

When the voltages A, $\overline{A}$, B, and $\overline{B}$ reverse, it is the transistors Q2 and Q4 as well as Q6 and Q8 which attempt to drive current through the windings W1 and W2. Moreover, it is the diode D3 and FET Q4 which carry the recirculation current from the winding W1 and the diode D7 and FET Q8 which carry the recirculation current from the winding W2. Similarly, the reset currents are carried by the diodes D1 and D3 from the winding W1 and the diodes D5 and D7 carry the reset current from the winding W2.

In all of these, the two current wave forms are synchronized so that one power cycle 1 and one reset cycle 3 begin at the same time, e.g. at times t1, t2 t3, . . . . This maximizes the electrical energy transfer from one winding to the other and reduces electrical noise and I$^2$R losses associated with restoring this energy in the power supply.

During power cycle of one winding, such as W1, and reset cycle of another winding, such as w2, power is first transferred from W2 to W1. The reset ends first. When the reset ends, power is delivered from the source to the winding W1 until end of reset cycle. Hence, synchronization controls the current to the windings. FIG. 17 shows the power pulses from the supply to the winding W1 for the remainder of the reset cycle. The synchronism affects the power favorably. Reset cycles such at times t1a, t2a, t3a, t4a, etc. Power cycles begin at times t1b, t2b, t3b, etc.

The new four-cycle synchronous two-phase circulating driver system digitally controls the motor current ripple frequency by a clock and is therefore independent of the external supply voltage or motor inductance. The clock is set above 20 KHz or more so that unwanted audio noise is eliminated. The ripple current is the current shown in Figs. 13 and 14. The ripple current magnitude is controlled by the duration of the one-shots 44 and 54.

Current switching of both winding is synchronized by the two phase digital clock in order to minimize recirculating current flow back into the power supply. This reduces the electrical noise generated by the driver to power supply interconnection.

The small magnitude of the motor ripple current achieved with this clocked high frequency drive significantly reduces the eddy current losses in the motor, hence allows for lower operating temperatures in the motor, and allows for more usable output power to be available to the load.

The clocked current reset cycle-di/dt which occurs in each winding provides a controlled high frequency limit cycle action in the current regulation loop. This insures that the current does not exceed the comparators set point even during motor braking conditions.

The four cycle voltage transitions per chopping period in the motor winding effectively reduce the magnitude of the dv/dt switching noise by a significant factor, thereby reducing the capacitor coupling noise feed through the motor and associated cables.

While embodiments of the invention have been described in detail it should be noted to those skilled in the art that the invention may be embodied otherwise without departing from its spirit and scope.

For example, the time effect of the one-shots 44 and 54 may, in another embodiment of the invention, be accomplished by furnishing the comparators 36 and 46 with hysteresis. The output of the comparators 44 and 54 would then provide the signals M$_A$ and M$_B$.

What is claimed is:

1. For energizing windings of a motor from a source, a motor driver, comprising:
   a first switching circuit having switches for alternately applying current to one of the windings during successive periods;
   first measuring means for measuring the current through the winding;
   first interrupt means for enabling and disabling said switches during a period; and
   first timing means responsive to said measuring means and coupled to said interrupt means for causing said interrupt means to enable and disable said switches during a period to produce a power cycle in which current flows through the winding, then a first circularing cycle in which current flows from the winding and back to the winding entirely within the switching circuit and outside the source, and then a reset cycle in which current flows from the winding through the source against the polarity of the source;
   a second switching circuit having switches for applying current to a second winding during successive periods;
   second measuring means for measuring the current through the second windings;
   second interrupt means for enabling and disabling the switches during a second period 90 offset form the first period; and
   second timing means responsive to said second measuring means and coupled to said second interrupt means for causing said second interrupt means to enable and disable said switches during a period to produce current flows during a second set of cycles corresponding to the power cycle, the circulating cycle, and the reset cycle of asid first timing means in said second winding; and
   coordinating means for constraining said first timing means and said second timing means to cause the reset cycle of one winding to occur during the power cycle of the other winding.

2. A device as in claim 1, wherein said first and second timing means each includes means for causing said interrupt means to enable and disable said switches during each period to produce a second circulating cycle in which current flows from each winding and back to the winding entirely within the switching circuit and outside the source.

3. A device as in claim 2, wherein one of said timing means includes a clock for initiating said power cycles and said reset cycles.

4. A device as in claim 1, wherein said first timing mean responds to said first measuring means for measuring a predetermined current to initiate a first circulating cycle.

5. A device as in claim 3, wherein said first timing means responds to said first measuring means for measuring a predetermined current to initiate a first circulating cycle.

6. A device as in claim 4, wherein said first timer means includes a one-shot circuit responsive to said clock for initiating the reset cycle after a predetermined time from the start of the first circulating cycle.

7. A device as in claim 4, wherein said second timing means responds to said second measuring means for measuring a predetermined current to initiate the first circulating cycle.

8. A device as in claim 5, wherein said second timing means responds to said second measuring means for measuring a predetermined current to initiate the first circulating cycle.

9. A device as in claim 6, wherein said second timing means includes a one-shot circuit responsive to said clock for initiating a second recirculating cycle after a predetermined time from the start of the reset cycle.

10. A device as in claim 9, wherein each of said timing means includes a flip-flop responsive to one of said measuring means for assuming one condition before current reaches a predetermined value and assuming a second condition after said current reaches the predetermined value for initiating the first circulating cycles, and a one-shot circuit responsive to the flip-flop for initiating the reset cycles in response to the clock.

11. A device as in claim 1, wherein each of said switching circuits includes a bridge having a plurality of transistor switches.

12. A device as in claim 2, wherein said switching circuits each includes a bridge having a plurality of transistor switches.

13. A device as in claim 5, wherein said switching circuis each includes a bridge for having a plurality of transistor switches.

14. A device as in claim 10, wherein said switching circuits each includes a bridge having a plurality of transistor switches.

15. A device as in claim 11, wherein each of said interrupt means includes a plurality of AND gates each connected to one of aid transistors and one of said timing means.

16. A device as in claim 12, wherein each of said interrupt means includes a plurality of AND gates each connected to one of said transistors and one of said timing means.

17. A device as in claim 13, wherein each of said interrupt means includes a plurality of AND gates each connected to one of said transistors and one of said timing means.

18. A device as in claim 15, wherein each of said interrupt means includes a plurality of AND gates each connected to one of said transistors and one of said timing means.

19. For energizing phases of a motor winding arrangement from a source, a driver, comprising:
switching means having switches for applying current to each of the winding phases in cycles within successive periods for each winding phase with each period including a power cycle in which current is made to flow from the source to a winding phase and a reset cycle in which the winding phase induces a current flow,
current measuring means for measuring the current in the winding phases, and
control means responsive to the current in each of the winding phases and coupled to said switching means for constraining said switching means to cause a reset cycle in one winding phase to occur during a power cycle in another winding phase.

20. A device as in claim 19, wherein said switching means further includes means for producing circulating cycles after each of the power and reset cycles and during which circulating cycles the winding phases induce current through the switching means but outside the source.

21. A device as in claim 19, wherein said measuring means includes separate sensing means each for sensing the current in one of said winding phases, and said switching means includes a switching bridge with said switches for each winding phase and separate flip-flop means responsive to each of said sensing means for enabling and disabling switches of said bridges.

* * * * *